April 30, 1963
D. K. CAVENAH
3,087,335
FLOW RATE INDICATOR
Filed May 23, 1960
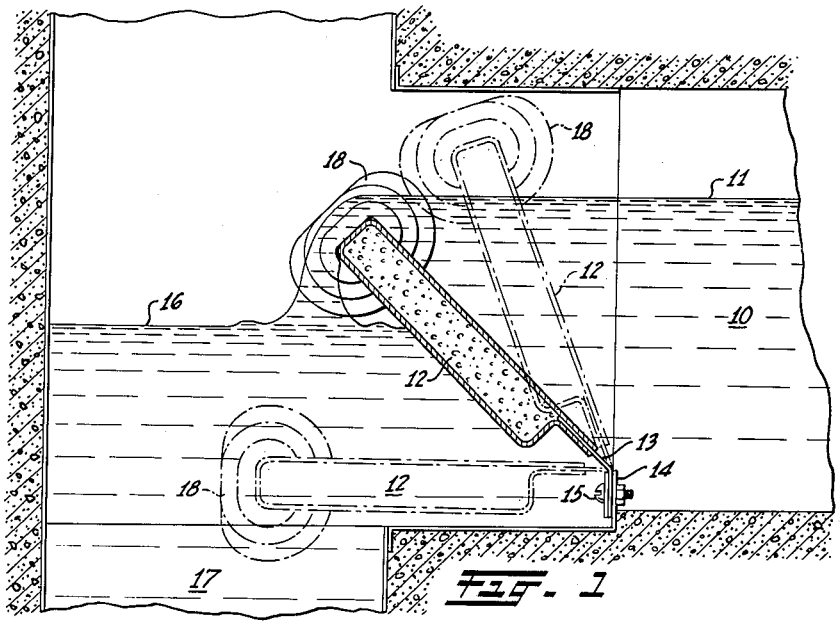
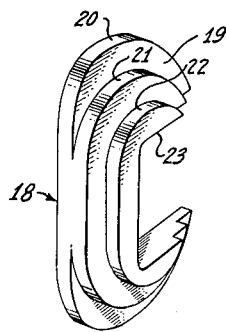
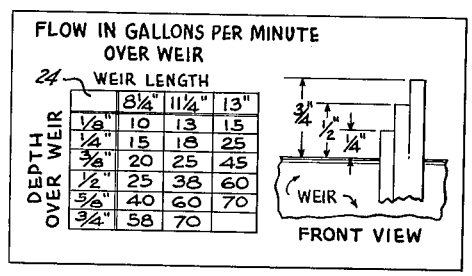
INVENTOR:
DAVID K. CAVENAH
BY
Mellin and Hanscom
ATTORNEYS

United States Patent Office 3,087,335
Patented Apr. 30, 1963

3,087,335
FLOW RATE INDICATOR
David K. Cavenah, North Hollywood, Calif.
Filed May 23, 1960, Ser. No. 31,025
5 Claims. (Cl. 73—215)

This invention relates to a flow rate indicator for use with weirs, or the like. More specifically, the invention involves a depth gauge indicator that may be mounted to a buoyant member for indicating the flow rate of fluid passing through a conduit.

Many modern day swimming pool constructions employ means for skimming debris from the surface of the water. Typical of such skimming means are those described in United States Patents 2,701,235 and 2,826,307. These skimming devices include weir plate members that are buoyed up by the water in a well pocket, from which the water is then pumped through a filtering system. Although each surface skimmer and filter system has a rated flow at which it should be operated, no cheap and simple device has been available for determining the flow rate of water drawn from the pool. It is toward this end (and with this problem in mind) that the present invention was conceived.

It will be particularly noted that the weir plate members used in these above described systems serve as a barrier to the debris that collects in the well pocket, thereby preventing reverse flotation of the debris from the well into the pool during periods when the filtering system is not in use. Inasmuch as the water level within a pool may vary over short time intervals, it is necessary that the weir members be adapted to accommodate whatever water level may then be existent. For this reason the weir plate members are made buoyant by the attachment of a float member, or may themselves be formed of buoyant material.

In brief, the invention is directed toward a generally U-shaped depth gauge that is adapted to be fitted over the top surface of a weir. Lines of graduation, as provided by a stepped surface, are arranged specific distances above the top surface of the weir to indicate the depth of water passing thereover. And inasmuch as the depth of water may be used as an indication of fluid flow rate, the volume rate of flow may be tabulated for any width of weir member. Since the weir members as employed in the conventional skimming systems are pivotally and buoyantly mounted, the invention further provides a depth gauge having continuous arcuate lines of graduation for indicating particular fluid flows irrespective of the angular position of the weir.

The various objects and many advantages of this invention will become readily apparent in view of the following detailed description, taken conjunctively and in reference to the accompanying drawings.

In the drawings, forming a part of this application, and in which like numerals are used to designate like parts throughout the same, FIG. 1 is a side elevation of a conduit having a buoyant weir member pivotally mounted therein and illustrating one embodiment of this invention attached to said weir member for indicating flow rate;

FIG. 2 is a perspective view of the indicator embodiment of FIG. 1, showing more particularly its stepped surface which defines lines of graduation; and FIG. 3 is a graphic tabulation of flow rate values which are correlated to specific graduations that may be provided by an exemplary embodiment of flow indicator.

Referring to FIG. 1, a fluid passageway 10, such as commonly used in swimming pool constructions, extends inwardly from the top surface of a pool (not shown). While the water level within the pool and conduit is subject to change, it may be assumed that a water level 11 is presently existing. The buoyant weir member 12 is pivotally mounted from the bottom of said conduit in a conventional manner, as by a flexible plastic strap 13 connected to an upstanding flange 14 by means of bolts 15. Weir 12, which is made of buoyant material such as styrene, floats upon the surface level 16 of water within a well compartment 17.

In a well known manner, the water within compartment 17 is pumped therefrom through a filtering system and fed back into the pool. The water level 16 within compartment 17 is maintained, therefore, at a level below that of water level 11 in passageway 10 by virtue of the weir 12 and the pumping action. And the position of weir 12 will be dependent upon the water level within passageway 10 and the rate at which water is pumped from compartment 17. Accordingly, the position of the weir will be changed for a different water level within passageway 10 even though the rate of fluid flow from compartment 17 is held constant.

Inasmuch as each surface skimmer and filter system has a rated flow at which it should be operated, it is essential that the rate of flow from compartment 17 be determined from time to time. For this purpose, a flow indicator 18 has been provided comprising a U-shaped depth gauge that may be mounted upon the weir.

Flow indicator 18 includes a stepped surface 19 having a series of arcuate steps 20, 21 and 22 which form continuous lines of graduation. The steps 20, 21 and 22 are arranged specific distances from points along the bottom 23 of the U-shape, and when the indicator is mounted upon the weir said steps provide a vertical indication or measure of specific distances above the then existent top surface of weir 12. Thus, although the buoyant weir may change its position (being responsive to changes in water level of the swimming pool), each step provides a visual indication of the depth of water flow over the top of said weir. Since the flow rate of fluids across the weir is proportional to this distance measurement, it is possible to provide a reference table 24, such as shown in FIG. 3, for determining the number of gallons of water being pumped from compartment 17 each minute.

Reference table 24 illustrates how the volume flow rate varies for different widths of weirs and particularly correlates certain stepped increments and weir widths with volume flow rate data. Of course, many different stepped increments may be provided on the flow indicator 18, and those which have been shown were selected as practical examples based upon convenience and design considerations.

To briefly summarize the method of operation, flow indicator 18 is placed upon the top surface of a weir 12 with its U-shaped recess disposed thereover, and with the bottom 23 positioned with respect to the weir. By design, the U-shape may be varied to accommodate various sizes and width shapes of weirs, and by making the leg portions of the U-shape slightly convergent the indicator may be wedged over the weir's upper edge. Once positioned, and assuming the steps to be arranged in relation to the top surface of the weir, the various depths of water flow over the weir may be quickly observed, thereby providing an indication of flow rate. If desired, information as to volume flow rates may be tabulated for one or more weir widths, in the manner illustrated.

It is to be understood that while a preferred embodiment of this invention has been illustrated and described, various changes in size, shape and design may be resorted to without departing from the spirit of the invention or the scope of the attached claims, and each of such changes is contemplated.

Having thus described my invention, what I claim and desire to secure by Letters Patent is:

1. In combination, a pivotally mounted weir and a flow indicator mounted upon said weir in the path of fluid flow, said indicator comprising a depth gauge having continuous arcuate lines of graduation arranged specific distances above the existent top surface of said weir, said lines extending in directions normal to the pivot axis of said weir, thereby indicating particular fluid flows irrespective of the angular position of said weir.

2. In combination, a pivotally mounted weir and a flow indicator mounted upon said weir in the path of fluid flow, said indicator comprising a depth gauge having a stepped surface, said surface being defined by a series of arcuate steps, each step arranged a specific distance above the existent top surface of said weir and extending in directions normal to the pivot axis of said weir for indicating the flow rate.

3. A flow indicator comprising: a depth gauge having a generally U-shaped slot adapted to be fitted over the top surface of a pivoted weir, said depth gauge having arcuate lines of graduation arranged specific distances from the bottom of said U-shaped slot for indicating the flow rate of fluid passing over the top surface of a weir, said arcuate lines extending in directions normal to the pivot axis of said weir when said gauge is mounted thereon.

4. A flow indicator comprising: a depth gauge having a generally U-shaped slot adapted to be fitted over the top surface of a pivotally mounted weir, said depth gauge having continuous arcuate lines of graduation arranged specific distances from points along the bottom of said U-shaped slot for indicating the flow rate of fluid passing over the existent top surface of a weir irrespective of the angular position of a weir, said arcuate lines extending in directions normal to the pivot axis of said weir when said gauge is mounted thereon.

5. A flow indicator comprising: a depth gauge having a generally U-shaped slot adapted to be fitted over the top surface of a pivotally mounted weir, and having a stepped surface, said surface being defined by a series of arcuate steps, each step arranged specific distances from points along the bottom of said U-shaped slot for indicating the flow rate of fluid passing over the existent top surface of a weir irrespective of the angular position of a weir, said arcuate steps extending in directions normal to the pivot axis of said weir when said gauge is mounted thereon.

References Cited in the file of this patent

UNITED STATES PATENTS

| | | |
|---|---|---|
| 1,056,178 | Humphrey | Mar. 18, 1913 |
| 2,826,307 | Pace | Mar. 11, 1958 |